Oct. 24, 1967     J. J. BRAUTOVICH     3,348,661
STORAGE AND RETRIEVAL APPARATUS

Original Filed Feb. 15, 1965     3 Sheets-Sheet 1

INVENTOR.
JOHN J. BRAUTOVICH
BY
ATTORNEY

Oct. 24, 1967    J. J. BRAUTOVICH    3,348,661
STORAGE AND RETRIEVAL APPARATUS
Original Filed Feb. 15, 1965    3 Sheets-Sheet 3

INVENTOR.
JOHN J. BRAUTOVICH
BY
ATTORNEY

United States Patent Office 3,348,661
Patented Oct. 24, 1967

3,348,661
STORAGE AND RETRIEVAL APPARATUS
John J. Brautovich, Monta Vista, Calif., assignor to Powerfile, Mountain View, Calif., a corporation of California
Original application Feb. 15, 1965, Ser. No. 432,731, now Patent No. 3,290,104, dated Dec. 6, 1966. Divided and this application Nov. 21, 1966, Ser. No. 595,894
8 Claims. (Cl. 198—181)

ABSTRACT OF THE DISCLOSURE

A conveyor utilizes a closed path chain to carry a plurality of containers about a continuous path. The containers are secured to the chain by cantilever arm means having a slot therein which straddles a pivot wheel on the container. The pivot wheel rides up in the slot when the containers pass around the end curves of the chain path, to compensate for radial displacement between the pivot wheel and the chain around the curves. The container is guided by follower wheels which ride in a channel under the container and which engage guide plates extending around the path on either side of the channel.

---

This is a divisional application of application Ser. No. 432,731, filed on Feb. 15, 1965, now U.S. Patent 3,290,-104, for "Storage and Retrieval Apparatus."

This invention relates to storage and retrieval apparatus, and particularly to such apparatus adapted to be integrated with one or more office desks to provide an efficient work unit.

Modern office procedures involve ever increasing amounts of paper work and filing. There is clearly a very substantial need for an improved arrangement for storing and retrieving files. In most cases it is present office practice to employ only manually operated file containers and to arrange such file containers at locations which require office personnel to leave their desks in order to place material in or obtain material from the containers.

Accordingly, it is an object of the present invention to provide improved storage and retrieval apparatus which may form a unitary structure with a desk wherein the desk functions in the usual manner and in addition a substantial volume of files can be stored and retrieved automatically by personnel sitting at the desk.

More specifically, an object of the invention is to provide automatic storage and retrieval apparatus which is smaller for a given amount of storage than prior designs. In addition to the usual benefits brought about by compact construction, the construction according to the invention makes it possible to associate a conventional size desk or desks with storage and retrieval apparatus which will accommodate conventional size files and yet not extend above the height of the desk top.

Another and related object of the invention is to provide automatic storage and retrieval apparatus in which the storage boxes travel in a horizontal plane whereby the apparatus can be made to have a horizontally extending cabinet having a work surface substantially at conventional desk top height.

A further object of the invention is to provide storage and retrieval apparatus of the type having storage boxes attached to a continuous path conveyor for travel in a horizontal plane, wherein improved means are provided for holding the storage boxes in a closely spaced relationship.

Other and further objects and features of advantage will become apparent from the following detailed description wherein reference is made to the accompanying drawings, in which.

Figure 1:
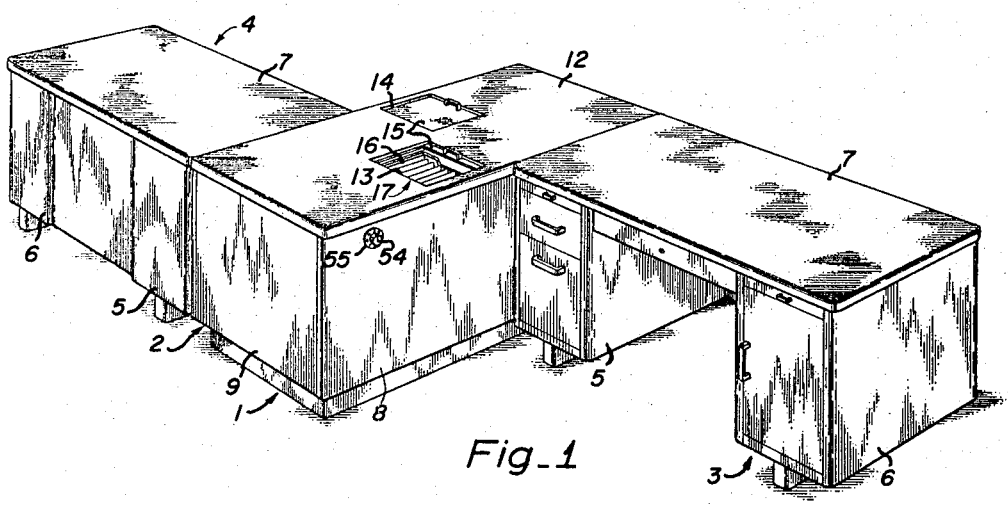
FIG. 1 is a perspective view of an embodiment of storage and retrieval apparatus according to the invention and associated with a plurality of desks.

Referring now to FIG. 1, there is shown in perspective representation a storage and retrieval apparatus 1 disposed in a cabinet 2 and a pair of conventional desks 3 and 4. Each of the desks comprises two support pedestals 5 and 6 which are spaced apart to provide the usual kneehole. Each of the desks has a top 7 supported on the pedestals 5 and 6. The cabinet 2 has side walls 8–11 (all four shown in FIG. 3) and a top 12. The cabinet 2 is designed so that the top 12 thereof is of the same height as the tops 7 of the conventional desks. In addition, the cabinet top 12 is provided with two openings 13 and 14, each preferably provided with a sliding cover 15. Thus, the embodiment of FIG. 1 provides an arrangement in which two conventional desks can be placed beside the storage and retrieval apparatus 1 to provide an integrated three-piece unit which conserves space and is efficient to use. It should be noted that since the cabinet top 12 is the same height as the desk tops 7, a large area of continuous work surface is provided.

Figure 2:
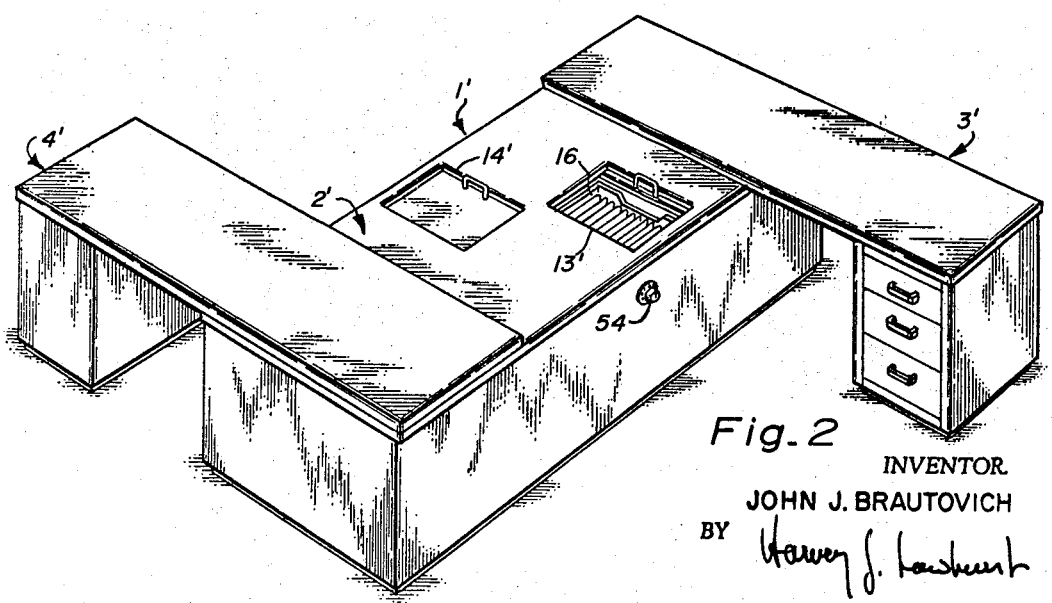
FIG. 2 is a perspective view of storage and retrieval apparatus similar to FIG. 1 but associated with desks in a unitary structure.

The modified arrangement of two desks and a storage and retrieval apparatus is shown in FIG. 2. Here the cabinet 2' for the storage and retrieval apparatus 1' is shorter in height than the cabinet 2 shown in FIG. 1 in order to support the tops of desks 3' and 4' at conventional desk top height. In addition, the cabinet 2' is longer than cabinet 2 to accommodate the overlapping positions of desks 3' and 4'. Also the positions of the filing and removal stations 13' and 14' are modified to accommodate the overlapping positions of desks 3' and 4'.

In order to provide storage and retrieval apparatus which will accommodate a large volume of conventional size files usable from two desk positions and still fit in a cabinet which forms the desired unit with two desks, a special construction is required for the internal mechanism of the storage and retrieval apparatus. Such internal mechanism will now be described, with particular reference to FIGS. 3–5.

Figure 3:
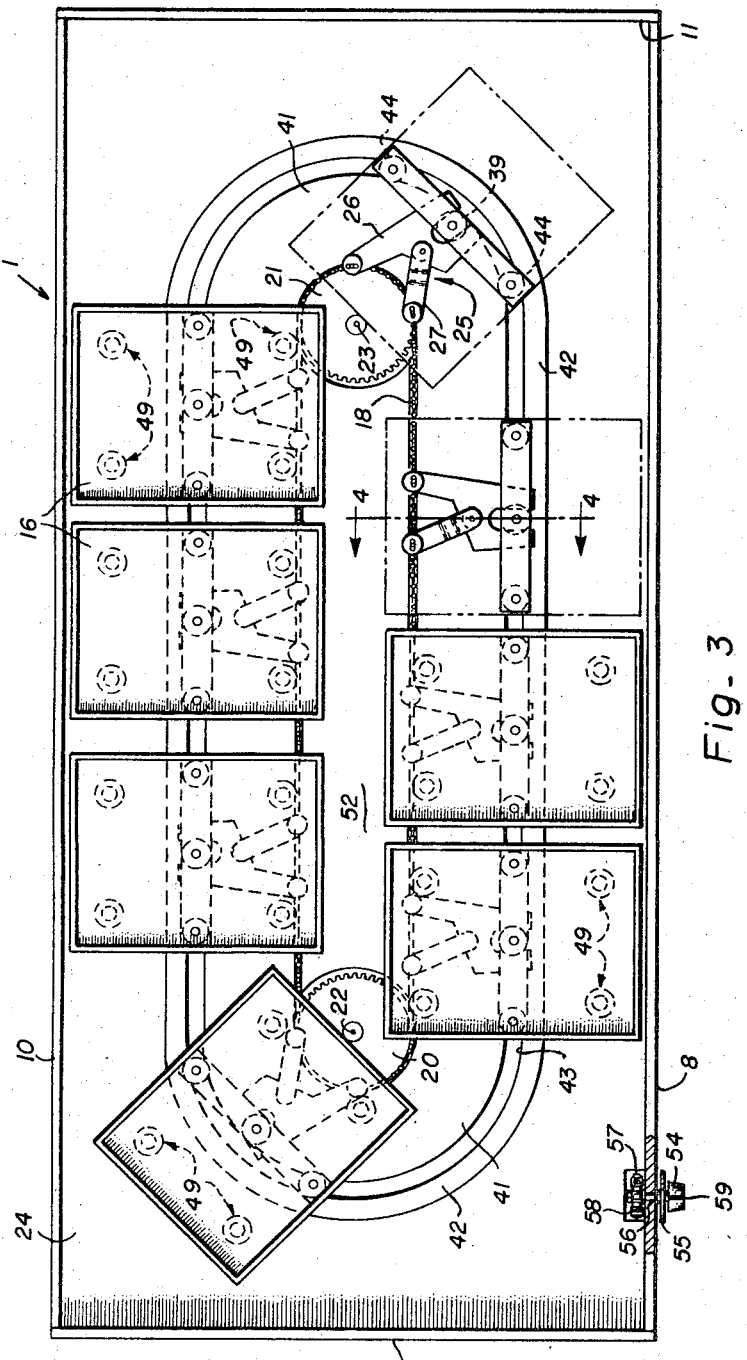
FIG. 3 is a top view on enlarged scale showing the storage and retrieval apparatus of FIGS. 1 and 2 with the top of the cabinet removed to show the internal mechanism.

Turning now to FIG. 3, the storage and retrieval apparatus 1 comprises a plurality of storage boxes 16 which are preferably open top containers made from any appropriate material such as wood, metal or plastic. Also, the storage boxes 16 are of a size to receive conventional size files, and preferably the boxes are shaped so that their width will accommodate the length of the files referred to as a group at 17 in FIG. 1. The files have been removed from the boxes in FIG. 3 to clarify the showing of the operating mechanism. However, it will be obvious from a comparison of FIGS. 1 and 3 that the files 17 will be in the same reading order at station 13 for a person at desk 3 as they are at station 14 for a person at desk 4.

Each of the boxes 16 is mounted in a special way on a continuous chain 18 preferably comprising pivotally interconnected metal links of conventional form. The term chain is used throughout the specification and claims in the broad sense of a continuous length of material which can be driven around a closed path. The chain 18 is trained in a substantially horizontal plane about two end sprocket wheels 20 and 21 mounted on vertically extending shafts 22 and 23, respectively. The shafts are journaled in a horizontal support platform 24 secured inside the cabinet 2. A conventional electric motor (not shown), is positioned below platform 24 and is drivingly connected to shaft 23 to drive the sprocket wheel 21. The means of power transmission from the electric motor to sprocket 21 may be similar to that described in my aforementioned copending application.

Figure 4:
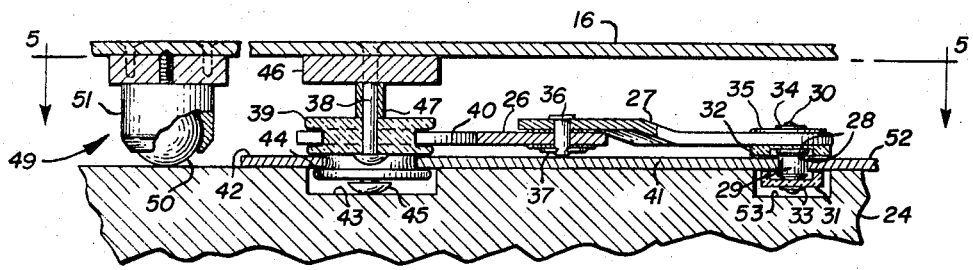
FIG. 4 is a cross-sectional view on enlarged scale taken on the line 4—4 of FIG. 3 and showing in detail the means for connecting the storage boxes to the continuous chain.
Figure 5:
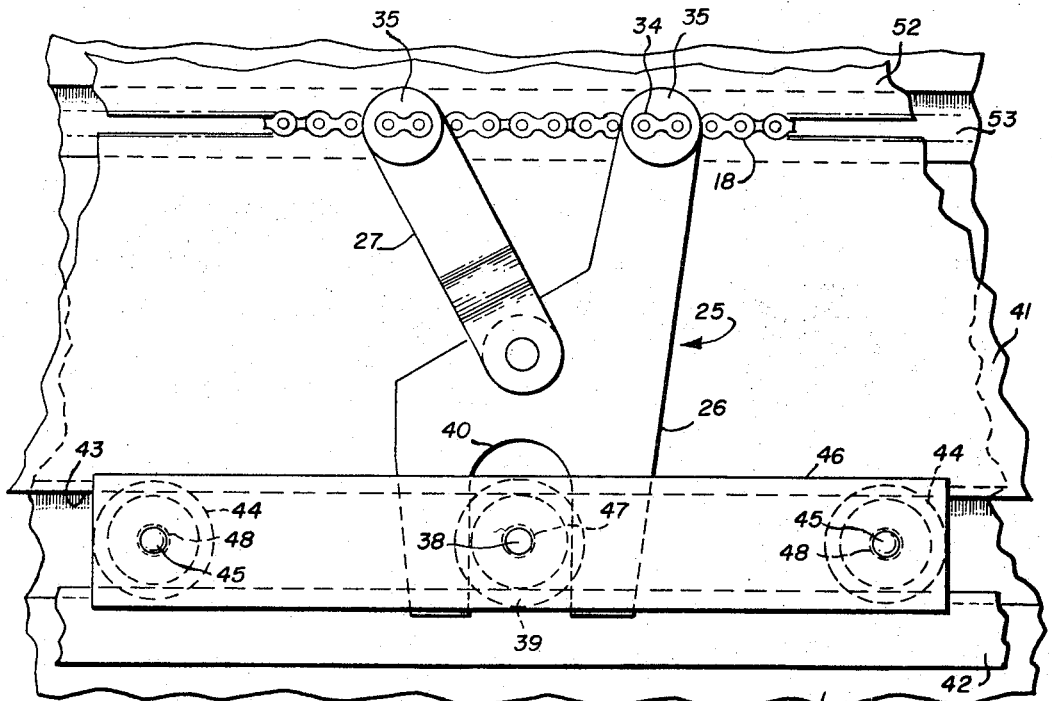
FIG. 5 is a plan view taken on the line 5—5 of FIG. 4.

The special means for mounting the storage boxes 16 on the chain 18 will now be described whereby in addition to FIG. 3 attention is directed to FIGS. 4 and 5. In general, the mounting comprises a cantilever attachment means 25, connecting the boxes 16 to chain 18. The cantilever nature of the attachment is important because it is only by this means that the storage boxes 16 can be so closely spaced as shown; that is, in almost touching side-by-side relation. If the storage boxes were connected directly to the chain and were closely spaced as shown they would crowd into each other in attempting to go around the turns at the ends of the path. Each of the attachment means 25 comprises a first or main arm 26 and an auxiliary or second arm 27. The arms 26 and 27 are each connected to chain 18 at spaced positions therealong. The other end of arm 26 is pivotally connected to its respective box, and the other end of arm 27 is pivotally connected to the outer portion of arm 26. Chain 18 is preferably made of conventional overlapping metal links 28 interconnected by pivot pins. The links 28 on opposite sides of the chain are held apart by short spacing cylinders 29 which rotatably surround the pivot pins through the ends of the links. In order to connect each arm to the chain, two of the regular short pivot pins are each replaced by a long pivot pin 30. A guide disk 31 is placed on one side of the chain 18, and a guide disk 32 is placed on the other side of the chain. The two long pins 30 for each of the two arms are swaged over washers 33 to hold disks 31 in place and are swaged over elongated washers 34 to hold in place a cover ring 35 and disks 32. The associated cantilever arm is thus held between the ring 35 and the disk 32.

The connection between cantilever arms 26 and 27 is formed by a pivot pin 36. The head of pin 36 engages arm 27 and the pin is held in place by a snap ring 37 on the lower end of the pin. The connection between the cantilever arm 26 and the bottom of the box 16 it supports is formed by a pivot pin 38. One end of pin 38 is countersunk in the bottom of box 16, and the head at the other end of the pin engages a follower wheel 39 which is rotatably received on the pin 38. The cantilever arm 26 is provided with a slot 40, and the periphery of the follower wheel 39 is provided with an annular groove which receives and rolls along the edges of the walls which form slot 40.

To properly orient boxes 16 with respect to chain 18, there is provided a guide means comprising an inner supporting and guiding plate 41 and an outer supporting and guiding plate 42. Both of the plates are secured to the upper surface of the platform 24 by any appropriate conventional means such as nails, screws or glue. The platform 24 is provided with an elongated oval track or channel 43 underlying the adjacent edges of the guide plates 41 and 42. A pair of guide wheels 44 for each box 16 are received in the track 43. The periphery of each wheel 44 is provided with an annular groove which receives the adjacent edges of plates 41 and 42. Each of the wheels 44 is connected to the box 16 by a pivot pin 45. A reinforcing bar 46 is attached to the bottom of each box 16, and the pivot pins 38 and 45 extend through the bar. A spacing sleeve 47 is located around pin 38 and similar sleeves 48 are located around pins 45. In order to take up most of the weight of boxes 16 and to hold them spaced above the cantilever driving means, a conventional ball roller unit 49 is placed adjacent each corner of each box. Each roller unit or support means comprises a ball 50 held for rotation in a collar 51 which is attached to the bottom of the box. The travel of the boxes is guided by the end wheels 44, and the actual drive for the boxes is provided by the center wheels 39. When the boxes go around the end curves, the necessary radial displacement of wheel 39 relative to the track 43 is accommodated by the slot 40.

In order to guide and support the horizontal reaches of chain 18 between the sprocket wheels 20 and 21, there is provided a center guide plate 52 attached to the platform 24 to cooperate with the inner edge of plate 41. The platform 24 is provided with an oval track or channel 53 underlying the adjacent edges of guide plates 41 and 52. The guide disks 31 are received in track 53 and abut the lower surfaces of plates 41 and 52 to prevent chain 18 from bouncing upward. The disks 32 slide along the upper surfaces of plates 41 and 52 to prevent chain 18 from sagging under the force of gravity. Lateral motion of the chain is prevented by engagement between the bearing cylinders 29 and the adjacent edges of plates 41 and 52.

In order to move individual boxes 16 selectively under the filing and removal stations 13 and 14, each side of the cabinet 2 is provided with a control knob 54 and a dial 55. Each of the knobs 54 is mounted on a shaft 56 journaled in the side wall and carrying a sprocket wheel 57. The sprocket wheel 57 drives a chain 58 which is connected to an appropriate selector switch mechanism (not shown). The switch mechanism may be of the type disclosed in my aforenoted copending application. Since the switch mechanism of FIGS. 1 or 2 is operated by two control knobs to bring selected boxes to two different stations, the pointer line 59 and dial 55 on the near side of the cabinet in FIGS. 1 and 2 are arranged to control the switch mechanism to bring the selected box 16 to the opening 13 and 13' respectively, whereas the pointer line and dial on the far side of the cabinet are arranged to control the switch mechanism to bring the selected box 16 to the opening 14 and 14' respectively.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. In a continuous path conveyor of the type including a closed path single chain trained about at least two spaced sprocket wheels to define at least two linear reaches, a plurality of containers carried by said chain, the improvement comprising:

cantilever means for securing each said container to and for maintaining each said container spaced from said chain, said cantilever means including:

a main arm, one end of said main arm being pivotally attached to said chain and the other end of said main arm being pivotally and slidably attached to said container;

an auxiliary arm, one end of said auxiliary arm being pivotally attached to said chain spaced from said one end of said main arm and the other end of said auxiliary arm being pivotally secured to said main arm intermediate the two said ends thereof;

guide means for positioning and supporting each said container, said guide means including:

a continuous track means spaced apart from said chain path; and follower means secured to each said container for slidably engaging said track means.

2. A conveyor as defined in claim 1, including a pivot wheel fixedly secured to said container, said other end of said main arm being provided with a slot straddling said wheel.

3. A conveyor as defined in claim 2, including a platform, said track means including a continuous channel in said platform, said follower means including at least two follower wheels secured to said container on either side of said pivot wheel and extending into said channel.

4. A conveyor as defined in claim 1, wherein said closed path and said track means lie in a common horizontal plane and are separated from each other at all points by a constant distance.

5. A conveyor as defined in claim 1, wherein said chain path and said track means include end portions of semi-circular configuration.

6. In a continuous path conveyor of the type including a closed path single chain trained about at least two spaced sprocket wheels to define at least two linear reaches, a plurality of containers carried by said chain, the improvement comprising:

cantilever means for securing each container to and maintaining spaced from said chain, said cantilever means including:
  a main arm, one end of which being pivotally attached to said chain, the other end of which being pivotally and slidably attached to said container;
  an auxiliary arm, one end of which being pivotally attached to said chain spaced from said one end of said main arm, the other end of said auxiliary arm being pivotally secured to said main arm intermediate the two said ends thereof;
a platform;
guide means for positioning and supporting each said container, said guide means including:
  a continuous track means including a continuous channel in said platform extending parallel with said chain and surrounding said closed path;
  follower means including at least two follower wheels secured to each said container on either side of said pivot wheel and extending into said channel for slidably engaging said track means;
a pivot wheel fixedly secured to said containers between said follower wheels, said other end of said main arm being provided with a slot straddling said wheel; and
guiding plate means having parallel edges overlying said channel, said follower wheels each being provided with a peripheral groove adapted to simultaneously engage opposed portions of said edges.

7. A conveyor as defined in claim 6, wherein said closed path and said track means lie in a common horizontal plane.

8. A conveyor as defined in claim 7, in which said platform is horizontal and disposed immediately under said containers, and including support means affixed to said containers, said support means movably engaging said platform for transferring thereto a substantial weight portion of said containers.

References Cited

UNITED STATES PATENTS

| | | | |
|---|---|---|---|
| 1,276,007 | 8/1918 | Bausman | 198—181 |
| 2,224,799 | 12/1940 | Schmid | 104—172 |
| 2,277,309 | 3/1942 | Doll | 198—19 |
| 2,717,699 | 9/1955 | Spindler et al. | 198—181 |
| 2,729,531 | 1/1956 | Anderson | 312—26 |
| 2,803,198 | 8/1957 | McCaul et al. | 104—172 |
| 2,866,537 | 12/1958 | Immesberger | 198—181 |
| 3,204,756 | 9/1965 | Lesch | 198—19 |

EVON C. BLUNK, *Primary Examiner.*

M. L. AJEMAN, *Examiner.*